United States Patent [19]

Phillips

[11] Patent Number: 4,518,639
[45] Date of Patent: May 21, 1985

[54] GAME CUP WITH GAME INFORMATION UNDER THE ROLLED LIP

[75] Inventor: Stephen J. Phillips, Don Mills, Canada

[73] Assignee: Coca-Cola Limited, Toronto, Canada

[21] Appl. No.: 593,466

[22] Filed: Mar. 26, 1984

[51] Int. Cl.³ .............................................. B32B 7/06
[52] U.S. Cl. .......................................... 428/35; D7/6; 40/306; 206/459; 229/1.5 B; 273/139; 428/43; 428/542.8; 428/916
[58] Field of Search ................. 428/43, 916, 35, 542.8; 206/459, 217; 229/1.5 B; 40/306; 273/139; D7/6

[56] References Cited

U.S. PATENT DOCUMENTS

| | | | |
|---|---|---|---|
| 1,369,293 | 2/1921 | Mooney | D7/6 X |
| 1,714,121 | 5/1929 | Barbieri | 229/1.5 B |
| 1,749,658 | 3/1930 | Ault | 229/1.5 B |
| 1,798,339 | 3/1931 | Soulis | 206/217 |
| 2,328,872 | 9/1943 | Yealdhall et al. | 206/217 |
| 3,057,536 | 10/1962 | Warnsdorfer, Jr. et al. | 229/42 |
| 3,278,014 | 10/1966 | Thornton | 206/217 |
| 3,615,005 | 10/1971 | Segel et al. | 273/139 X |
| 3,827,620 | 8/1974 | Ludder | 40/306 X |
| 3,850,361 | 11/1974 | Day et al. | 40/306 X |
| 3,875,884 | 4/1975 | Zundel | 220/272 X |
| 3,920,120 | 11/1975 | Shveda | 206/217 |
| 3,964,633 | 6/1976 | Zundel | 220/273 |
| 4,044,484 | 8/1977 | Ludder | 40/306 |
| 4,074,827 | 2/1978 | Labe | 206/217 X |
| 4,084,015 | 4/1978 | Patterson | 428/43 X |
| 4,171,085 | 10/1979 | Doty | 206/459 |
| 4,181,219 | 1/1980 | Marion | 206/217 |
| 4,286,742 | 9/1981 | Pellegrino | 224/281 |
| 4,318,235 | 3/1982 | Augeri | 428/43 X |

Primary Examiner—Henry F. Epstein

[57] ABSTRACT

A game cup and method wherein the cup comprises a waxed paper cup having a rolled lip with game information printed inside of the rolled lip in a game information area thereof. A semi-circular snap-out section, defined by a series of spaced-apart slits, is located below the game information area of the lip but spaced therefrom. To reveal the printed game information, a finger is pushed in against the snap-out section to break it away from the remainder of the cup sidewall. The snap-out section is then pulled upwardly tearing a portion of the sidewall away up to the lip, and then the snap-out section and torn portion are moved or rotated around the rolled lip so as to unroll the rolled lip and reveal the printed game information.

19 Claims, 4 Drawing Figures

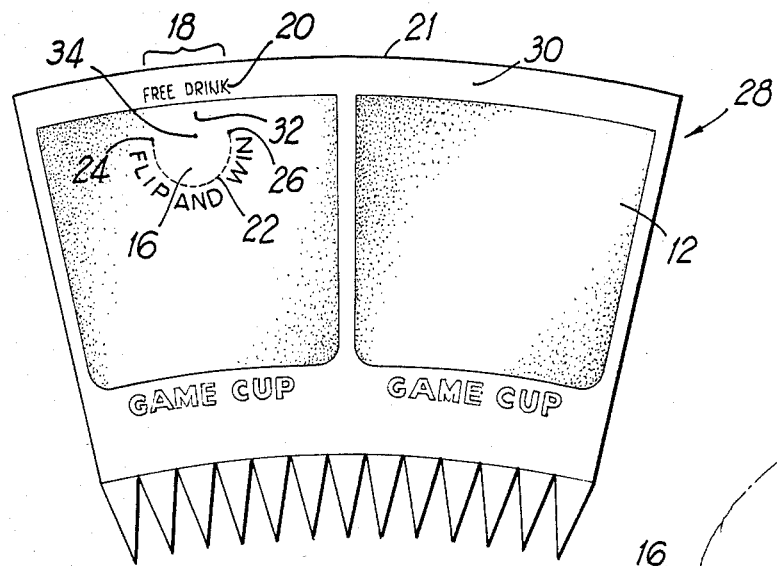
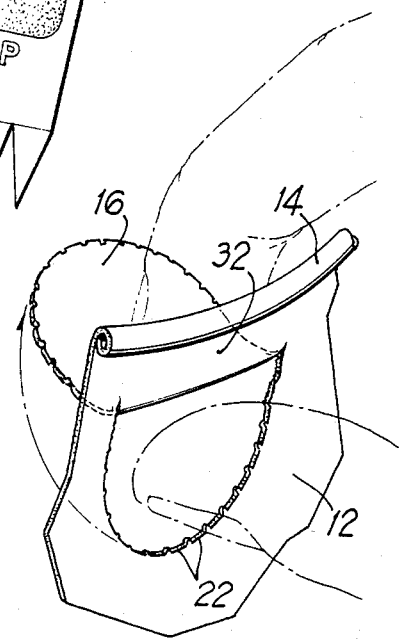
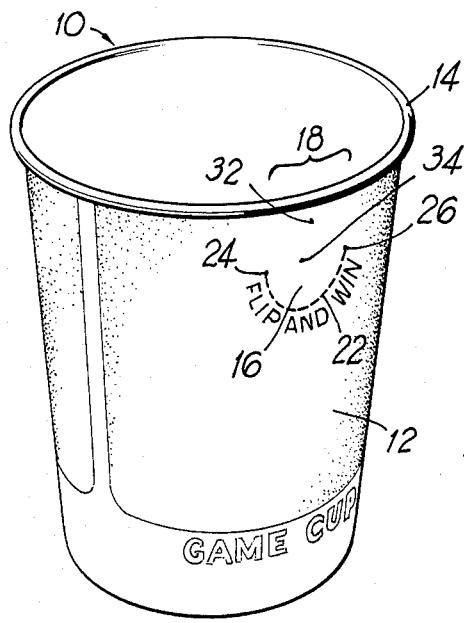
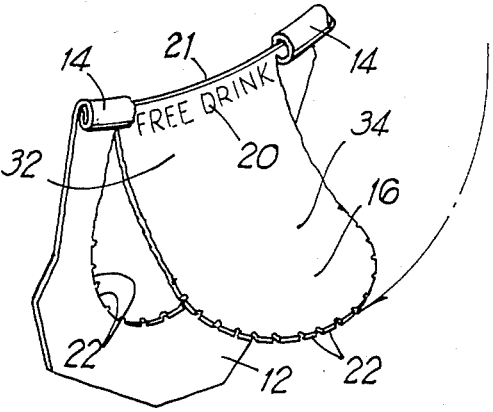
FIG 1
FIG 2
FIG 3
FIG 4

GAME CUP WITH GAME INFORMATION UNDER THE ROLLED LIP

BACKGROUND OF THE INVENTION

1. Field of the Invention

This invention relates to disposable containers such as paper cups and the like, and more particularly to a cup having a rolled lip with game or other promotional information hidden underneath the rolled lip thereof.

2. Description of the Invention

It is known in the art to provide paper cups with promotional information in the sidewalls, as shown in U.S. Pat. Nos. 3,827,620; 4,171,085; and 4,318,235. It is also known to provide promotional material in the bottoms of paper cups, as shown in U.S. Pat. Nos. 1,798,339; 2,328,872; 3,850,361; 3,920,120; and 4,181,219. Promotional material in lids for drinking cups is shown in U.S. Pat. Nos. 3,057,536; 4,044,484; and 4,074,827. It is also known to provide flavoring material in compartments adjacent the lip of a cup as shown in U.S. Pat. No. 3,278,014. It is also known to print information under the lip of paper drinking cups for use in quality control and audit functions.

It is an object of the present invention to provide a game cup and method in which the cup has a rolled lip with game information thereunder and with a snap-out section located below the game information for use in unrolling the rolled lip to reveal the game information.

It is another object of the invention to provide a paper cup blank with game information printed on a top portion thereof and having a snap-out section therebelow.

SUMMARY OF THE INVENTION

A game cup and method wherein the cup is preferably a waxed paper cup having a rolled lip with game information printed in a game location area under the rolled lip, and with a semi-circular snap-out section, defined by a series of slits in the cup sidewall, located below the game location area, whereby the game information can be easily and quickly revealed by simply pressing a finger against the snap-out section to break it loose from the cup wall, then pulling upwardly on snapped-out section to tear away the portion of the sidewall above the snapped-out section and between such snapped-out section and the rolled lip, and then moving such snapped-out section around the rolled lip in a direction to unwrap or unravel the rolled lip, thus revealing the game information printed under the rolled lip.

BRIEF DESCRIPTION OF THE DRAWING

The present invention will be more fully understood from the following detailed description when read in connection with the accompanying drawings wherein like reference numerals refer to like elements and wherein:

FIG. 1 is a plan view of a cup sidewall blank for use in making the cup of the present invention;

FIG. 2 is a perspective view of the cup of the present invention with the lip and snap-out section intact;

FIG. 3 is a partial, perspective view showing the snap-out section broken loose from the cup sidewall; and FIG. 4 is a view similar to FIG. 3 showing the snap-out section of FIG. 3 unrolled around the lip to reveal the game information.

DETAILED DESCRIPTION OF THE PREFERRED EMBODIMENT

With reference now to the drawing, FIG. 2 shows the game cup 10 of the present invention comprising a sidewall 12 having a rolled lip 14 and a conventional bottom (not shown). A semi-circular snap-out section 16 is located below a game information area 18 of the lip 14. Game information 20 (see FIG. 4) is printed adjacent a top edge 21 (see FIG. 1) of the sidewall 12, in the game information area 18, before the rolled lip 14 is formed.

The snap-out section 16 is at least partly surrounded or defined by snap-out means which preferably comprises a series of spaced-apart slits 22 preferably arranged in a semi-circle with the opening of the semi-circle facing upwardly toward the rolled lip 14 and with the ends 24 and 26 of the semi-circle being aligned with the respective ends of the game information area 18. The sidewall 12 of the cup 10 is formed from a sidewall blank 28 (see FIG. 1) having the top edge 21 and having a top portion 30 adjacent the top edge from which the rolled lip 14 is formed. The rolled lip 14 is preferably formed from a single turn of the material of the sidewall. The ends 24 and 26 of the semi-circle of slits 22 are preferably located about one-half inch below the top portion 30. The snap-out section 16 could be located adjacent to the rolled lip 14, however, it is preferably spaced below the lip 14 to prevent weakening of the lip area of the cup 10.

In order to uncover and reveal the game information 20, once the cup 10 is empty a finger is used to press in against the snap-out section 16 to break it partly loose from the cup sidewall 12 along the series of slits 22, as shown in FIG. 3, leaving an upper side 34 of the snap-out section 16 still connected to the sidewall 12. This section 16 is then pulled upwardly toward the game information area 18 of the rolled lip 14 tearing a portion 32 of the sidewall 12 away from the remainder of the sidewall. After the portion 32 has been torn away all the way up to the lip 14, the section 16 and the portion 32 are then moved or rotated around the rolled lip 14 to unroll the rolled lip in the area 18 thereof to reveal the game information 20, as shown in FIG. 4. The section 16, portion 32 and area 18 can then be ripped or torn away from the remainder of the cup, or they can be left attached at the lip, as desired.

The game cup 10 of the present invention can be made using any well-known procedures in the prior art. However, when the sidewall blanks 28 are die-cut from a roll of paper, such as a 2000 pound paper roll, the plurality of slits 22 are preferably die-cut at the same time. The slits 22 are preferably all die-cut at the same time using a die with a plurality of teeth arranged in a semi-circle. The slits 22 preferably go completely through the paper. The beverage in the cup 10 does not leak out through the slits 22 because when the die is removed the material essentially reseals itself; in addition, the cup is subsequent sprayed with wax which also seals the slits 22. The printing of the game information 20 is preferably done at the same time that the other printing on the sidewall 12 is done. The printing is preferably done on the paper roll prior to the die cutting. The printing can be any desired printing depending on the game being played. For example, the game information can include words such as "BONUS SERVING," or "TRY AGAIN."

After the printing and die-cutting, the blanks 28 are then peeled off of the paper roll and fed to a former where the game cups 10 are formed and conventional bottoms (not shown) are put on. The game cups 10 then are fed to a conventional waxing station, where they are waxed, such as by spraying, preferably with paraffin wax (food grade). The cups then come out dry and are hand packed. Some blanks 28 can be taken and sent to a silk screener to be printed with the top prize winning information. These are then fed back into the former at random.

It will be apparent that various alterations, modifications, and changes can be made in the preferred embodiment described herein without departing from the spirit and scope of the present invention as defined in the appended claims. For example, the game cup 10 can be of any size and of any material, but is preferably a waxed paper cup using bleached kraft cup stock. A preferred cup size is a cup height of 6.053 inch; a rim diameter of 3.655 inch, a bottom diameter of 2.531 inch, a sidewall angle of 4°15', and a cup capacity of 640 ml. Any types of bottoms can be used, any cup shapes can be used, and any desired process for making the cups can be used. The cups can be used with lids or not, as desired. The snap-out section 16 can have any desired shape and it can be defined by other "weakening means" than the specific slits 22 shown. The semi-circle of the snap-out section 16 preferably has a diameter of 0.598 inch, but other sizes can be used. The distance from the top of the cup to the bottom of the semi-circular series of slits is preferably 1.26 inch, thus leaving the section 16 approximately one-half inch below the lip 14. However, the section 16 can be located at any desired distance from the lip 14; preferably from about one-half to one inch. The term "game information" as used herein includes words, symbols, materials, etc. While a particular rolled lip is shown other types can be used.

What is claimed:
1. A beverage cup comprising:
  (a) a sidewall having a rolled lip,
  (b) said rolled lip having a game information area at a particular location thereof and including game information located in said area and being hidden by said rolled lip;
  (c) said sidewall including a snap-out section located below said area,
  (d) said snap-out section being partly defined by snap-out means for allowing said section to be partly broken loose from said sidewall while leaving a side of said section still connected to said sidewall; and
  (e) said section, when partly broken loose from said sidewall, being adapted to be moved around said rolled lip in said area to unroll said rolled lip in said area to reveal any game information in said area.

2. The game cup as recited in claim 1 wherein said snap-out section is spaced-apart from said rolled lip.

3. The game cup as recited in claim 2 wherein said snap-out section is located from approximately one-half to one inch below said rolled lip.

4. The game cup as recited in claim 3 wherein said snap-out means comprises a series of slits.

5. The game cup as recited in claim 4 wherein said slits are arranged in a semi-circle with the opening of the semi-circle facing upwardly toward said rolled lip and with the two ends of the semi-circle being in-line with the respective ends of said area.

6. The game cup as recited in claim 5 wherein said slits are die-cut through said sidewall.

7. The game cup as recited in claim 6 wherein said cup is a waxed paper cup.

8. The game cup as recited in claim 7 wherein said game information is printed adjacent a top edge of said sidewall.

9. The game cup as recited in claim 1 wherein said game information is printed adjacent a top edge of said sidewall.

10. The game cup as recited in claim 1 wherein said slits are arranged in a semi-circle with the opening of the semi-circle facing upwardly toward said rolled lip and with the two ends of the semi-circle being in-line with the respective ends of said area.

11. The game cup as recited in claim 1 wherein said cup is a waxed paper cup.

12. A method for revealing game information hidden on a beverage cup including a sidewall having a rolled lip comprising:
  (a) providing game information hidden underneath said rolled lip of said cup in a game information area thereof;
  (b) providing a snap-out section in said sidewall of said cup located below said area;
  (c) snapping said section partly loose from said sidewall but still connected to said sidewall at one side of said section; and
  (d) moving said section around said rolled lip to unroll said rolled lip to reveal said game information.

13. The method as recited in claim 12 wherein said section is spaced-apart from said rolled lip and is located from approximately one-half to one inch below said rolled lip, and including the step of pulling said partly snapped-out section upwardly to tear away the portion of said sidewall located above said section, up to said rolled lip, and then carrying out said moving step.

14. The method as recited in claim 13 wherein said section providing step comprises providing a series of spaced-apart slits in said sidewall in a semi-circular array with the opening of the semi-circle facing upwardly toward said rolled lip and with the ends of the semi-circle being in-line with the respective ends of said area.

15. The method as recited in claim 14 including coating said cup with wax.

16. The method as recited in claim 12 wherein said game information providing step comprises printing game information on a top portion of said sidewall prior to the formation of said rolled lip.

17. A sidewall blank for a paper cup to be provided with a rolled lip from a top portion of said blank adjacent a top edge thereof, said blank comprising:
  (a) a game information area in said top portion having printed game information therein; and
  (b) a snap-out section located below said area and being partly defined by snap-out means for allowing said section to be partly broken loose from said sidewall while having a side of said section still connected to said sidewall.

18. The blank as recited in claim 17 wherein said section is spaced-apart from said top portion and is located from approximately one-half to one inch below said game information area.

19. The blank as recited in claim 18 wherein said snap-out means comprises a series of spaced-apart slits arranged in a semi-circular array with the opening of the semi-circle facing upwardly toward said top portion and with the ends of the semi-circle being in-line with the respective ends of said area.

* * * * *